(12) United States Patent
Yeh et al.

(10) Patent No.: US 6,407,742 B1
(45) Date of Patent: Jun. 18, 2002

(54) METHOD AND APPARATUS FOR COMBINING MULTIPLE LINE ELEMENTS TO PRODUCE RESULTANT LINE DATA

(75) Inventors: Chun-Chin David Yeh, Markham; Philip L. Swan, Richmond Hill, both of (CA)

(73) Assignee: ATI International SRL, Barbados (KN)

( * ) Notice: Subject to any disclaimer, the term of this patent is extended or adjusted under 35 U.S.C. 154(b) by 0 days.

(21) Appl. No.: 09/288,730

(22) Filed: Apr. 9, 1999

(51) Int. Cl.[7] .................................................. G09G 5/36
(52) U.S. Cl. .......................... 345/558; 345/560; 710/53
(58) Field of Search .................................. 345/558, 560, 345/564, 531; 710/53, 56, 57, 71

(56) References Cited

U.S. PATENT DOCUMENTS

| | | | |
|---|---|---|---|
| 5,446,839 A | * 8/1995 | Dea et al. | 395/502 |
| 5,568,443 A | * 10/1996 | Dixon et al. | 365/230.05 |
| 5,633,686 A | * 5/1997 | Boden | 348/441 |
| 5,850,572 A | * 12/1998 | Dierke | 710/53 |
| 6,046,735 A | * 4/2000 | Bassetti et al. | 345/204 |
| 6,084,568 A | * 7/2000 | Premi et al. | 345/154 |
| 6,092,128 A | * 7/2000 | Maas et al. | 710/57 |

\* cited by examiner

*Primary Examiner*—Kee M. Tung
(74) *Attorney, Agent, or Firm*—Vedder, Price, Kaufman & Kammholz (57) ABSTRACT

A method and apparatus is presented for combining multiple data elements to produce resultant data elements, where the data elements used for combination are reused after being loaded into memory on an integrated circuit. The apparatus includes a memory, where the memory stores a plurality of lines of data. The apparatus further includes a circular line buffer operably coupled to the memory, where the circular line buffer stores a plurality of line elements from a portion of the plurality of lines of data. A read addressing block operably coupled to the circular line buffer generates a number of read pointers corresponding to the circular line buffer. Each of the read pointers is used to address the circular line buffer to retrieve one of the data elements from a different line stored in the circular line buffer. A combination block combines the line elements selected by the read pointers to produce a result element. A write pointer coupled to the circular line buffer is utilized to store data from the memory to the circular line buffer, where data stored in the circular line buffer replaces data which has already been read and used by the combination block. A controller operably coupled to the memory, the combination block, the circular line buffer, the read dressing block, and the write pointer provides control information such that the line element data in the circular buffer is read and replaced in an optimized manner that reduces the amount of memory required to store the line data elements for processing.

19 Claims, 5 Drawing Sheets

METHOD AND APPARATUS FOR COMBINING MULTIPLE LINE ELEMENTS TO PRODUCE RESULTANT LINE DATA

FIELD OF THE INVENTION

The invention relates generally to data processing and more particularly to a method and apparatus for combining multiple line data elements to produce resultant line data elements in a video graphics system.

BACKGROUND OF THE INVENTION

Generating a video graphics display typically involves generating a number of lines of video data that are provided to a display, where each line is generated on the display to produce the desired video image. In many cases, the data provided to the display is the result of processing operations that scale or filter the video information to produce resulting effects or to configure the lines of data to suit the requirements of the display. In filtering and scaling operations, the resultant pixels for a display line are often generated using a number of lines of data. For example, a three-tap filter may use data from three lines of image data to produce each resultant line.

In many applications, the lines of data to be filtered or scaled are stored in memory located external to the integrated circuit performing the data processing that produces the resultant line. In such systems, the data is often fetched from the memory and stored within an on-chip cache memory, or some other memory block located on the chip. Once the data has been brought on-chip, it is retrieved from the on-chip memory and used for the filtering, scaling, or similar operation. In some systems, data elements may be used multiple times in the filtering or scaling process. For example, in a three-tap filtering system, the fourth resultant line may be generated using the third, fourth, and fifth lines of image data, and the fifth resultant line is generated using the fourth, fifth, and sixth lines of image data. In these systems, efficiency is increased if data is reused once it is loaded into the on-chip memory, as fetching the data from off-chip consumes memory and processor bandwidth. Thus, if the fourth and fifth lines could be maintained for use in generating both the fourth and fifth lines of data, system efficiency would be increased. In order to be able to reuse data stored in the cache memory, the data must be allowed to remain present on-chip until the additional processing that utilizes that data occurs.

Unfortunately, some operations involve lines of data that include a large number of data elements. In the case where many lines of data are used to generate a single resultant line, storing all of the lines for processing can be problematic in terms of the amount of memory required.

Therefore, a need exists for method and apparatus for combining line data elements that allows for reuse of data elements loaded into on-chip memory where the amount of memory needed to store the data is less than that needed to store the full set of data required to produce a single resultant line.

DESCRIPTION OF A PREFERRED EMBODIMENT OF THE INVENTION

Generally the present invention provides a method and apparatus for combining multiple data elements to produce resultant data elements, where the data elements used for combination are reused after being loaded into memory on an integrated circuit. Such an apparatus includes a memory, where the memory stores a plurality of lines of data. The apparatus further includes a circular line buffer operably coupled to the memory, where the circular line buffer stores a plurality of line elements from a portion of the plurality of lines of data. A read addressing block operably coupled to the circular line buffer generates a number of read pointers corresponding to the circular line buffer. Each of the read pointers is used to address the circular line buffer to retrieve one of the data elements from a different line stored in the circular line buffer. A combination block combines the line elements selected by the read pointers to produce a result element. A write pointer coupled to the circular line buffer is utilized to store data from the memory to the circular line buffer, where data stored in the circular line buffer replaces data which has already been read and used by the combination block. A controller operably coupled to the memory, the combination block, the circular line buffer, the read addressing block, and the write pointer provides control information such that the line element data in the circular buffer is read and replaced in an optimized manner that reduces the amount of memory required to store the line data elements for processing. By reducing the amount of memory required to store the data for processing, the size of the circular buffer within the integrated circuit is reduced, thus reducing overall cost of the integrated circuit.

Figure 1:
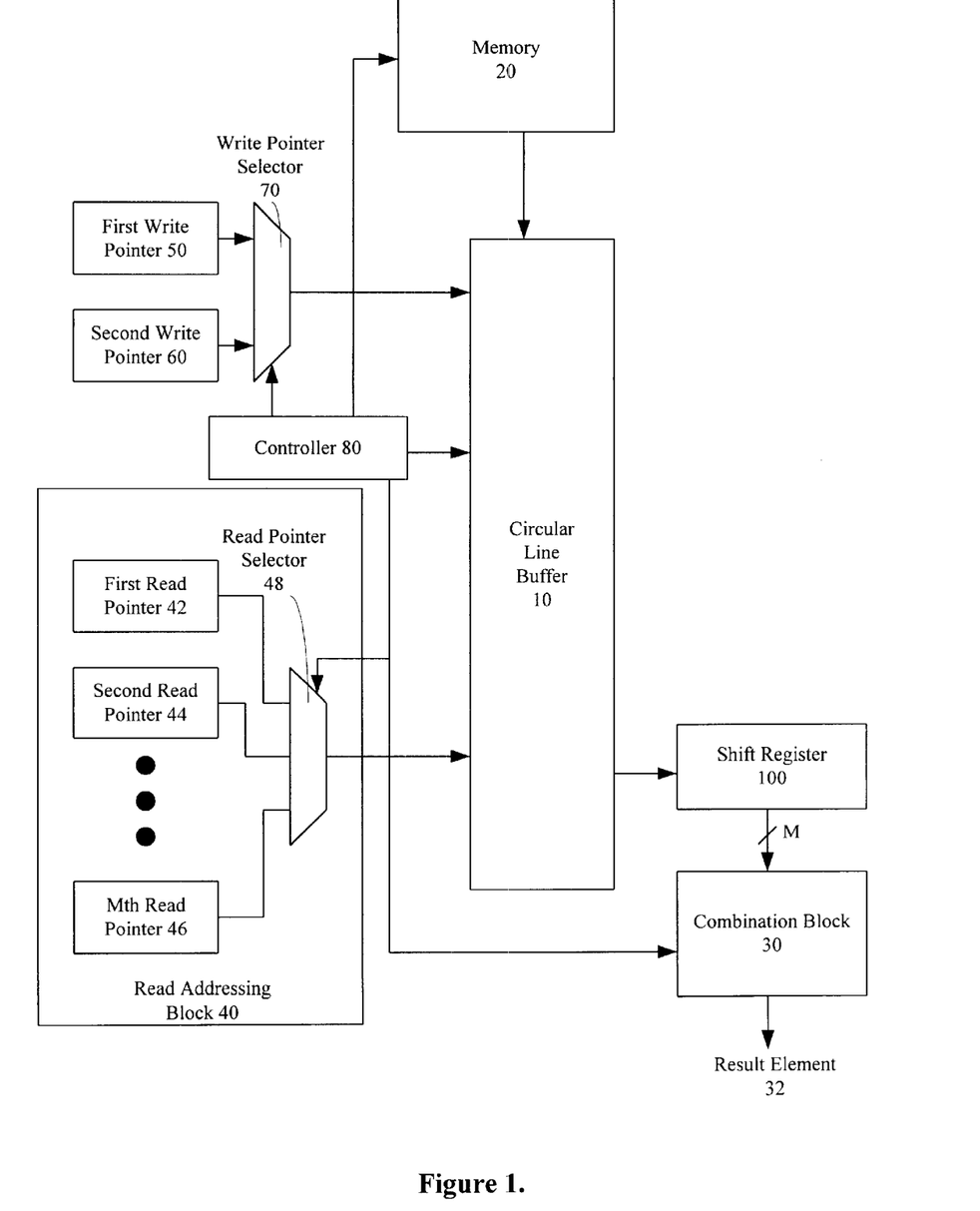
FIG. 1 illustrates a block diagram of a line combination unit in accordance with the present invention.

The invention can be better understood with reference to FIGS. 1–5. FIG. 1 illustrates a line combination unit that includes a memory 20, a circular line buffer 10, a combination block 30, a read addressing block 40, and a write pointer 50. The memory 20 stores a plurality of lines of data, and preferably, the lines are lines of image data used to generate images on a display.

The combination block 30 receives M line elements where M is a number. The combination block 30 combines the M line elements to produce a result element 32. Preferably, the combination block 30 performs functions such as scaling, filtering, or other functions that require multiple elements from multiple lines. Filtering may include flicker removal, which attenuates vertical spatial frequencies that appear to flicker when the image is displayed on an interlaced television or monitor.

In order to perform the combination operations on the line elements from multiple lines of data, a number of read operations are required to provide the data to the combination block 30. Because the memory 20 is often located off-chip, or external to the integrated circuit, the data must be buffered to ensure that the data is available for the combination operations without overburdening the memory such that other real time memory clients in the system are not interrupted or "data starved". The line elements are brought onto the chip and stored in a temporary buffer, such as the circular line buffer 10, and the data is then fetched from this buffer for use by the combination block 30. In order to process the data elements to produce a line of result elements, the combination block may require line elements from multiple lines stored in the memory 20. To take full advantage of the buffer on the integrated circuit, the combination block 30 reuses data that are loaded into the circular buffer 10 from the memory 20.

For example, in a three-tap filtering operation, the combination block 30 uses three lines of data elements to produce a single resultant line, and generation of the following line of resultant data uses two of the same three lines plus a new line. Although the line buffer could be constructed to hold three complete lines of data, and load in a new line of data when the oldest line of data was used for the last time, it would be inefficient. Fetching a new line of data at the end of processing one line may incur latency that is unacceptable in a video application that must meet display rate parameters or corruption of the display may result. If the line is fetched before the processing of the previous resultant line is complete, the size of the circular line buffer grows by a line of data, which can be significant and costly in an integrated circuit implementation. This is especially true in a video graphics application, where the number of pixels per line can be greater than a thousand, and each pixel may require four or more bytes to store the data describing that pixel.

For example, in a 1-2-1 flicker removal operation, the combination block 30 uses three lines of data elements to produce a single resultant line, and generation of the following line of resultant data uses two of the same three lines plus a new line. Although the line buffer could be constructed to hold three complete lines of data, and load in a new line of data when the oldest line of data was used for the last time, this would be inefficient. Fetching a new line of data at the end of processing one line may incur latency that is unacceptable in a video application that must meet display rate parameters or corruption of the display may result. If the line is fetched before the processing of the previous resultant line is complete, the size of the circular line buffer grows by a line of data, which can be significant and costly in an integrated circuit implementation. This is especially true in a video graphics application, where the number of pixels per line can be greater than a thousand, and each pixel may require four or more bytes to store the data describing that pixel.

The circular line buffer 10 illustrated in the line combination unit of FIG. 1 is structured to reduce the memory requirements for storing line element data for use by the combination block 30. The circular line buffer 10 stores lines of data and partial lines of data in a manner that rotates data in and out of the buffer in an optimal manner. This is accomplished by recognizing that in order to combine M data elements, fewer than M complete lines can be stored in the circular line buffer 10. Data is fetched from the memory 20 in a manner that replenishes the data in the circular line buffer 10 in a constant and continuous manner such that the amount of memory required to store the circular line buffer 10 is smaller than that which would be required to store M complete lines of data.

The read addressing block 40 generates M read pointers that address the circular line buffer to produce the M line elements for processing by the combination block 30. Preferably, each of the read pointers is sequentially applied to the circular line buffer to produce a serial stream of line elements. These line elements may be provided to a shift register 100 which will convert the serial stream of line elements to M parallel line elements. The shift register 100 presents the M line elements to the combination block 30 in parallel.

Preferably, the read addressing block 40 includes M read pointer registers 42–46, and each of the M read pointer registers 42–46 stores a read pointer that points to a line element of a different line in the circular line buffer 10. A read pointer selector 48 operably coupled the read pointer registers 42-46 selects one of the read pointers to be applied to the circular line buffer 10.

At least one write pointer 50 is used to determine where data fetched from the memory 20 is to be stored in the circular line buffer 10. The control of the movement of data in the system is preferably performed by the controller 80. The controller 80 is operably coupled to each of the system elements, and provides the required control information to insure that the system operates correctly. The controller 80 preferably controls the read pointer selector 48 and asserts the memory commands to the circular line buffer 10 and the memory 20.

Figure 2:
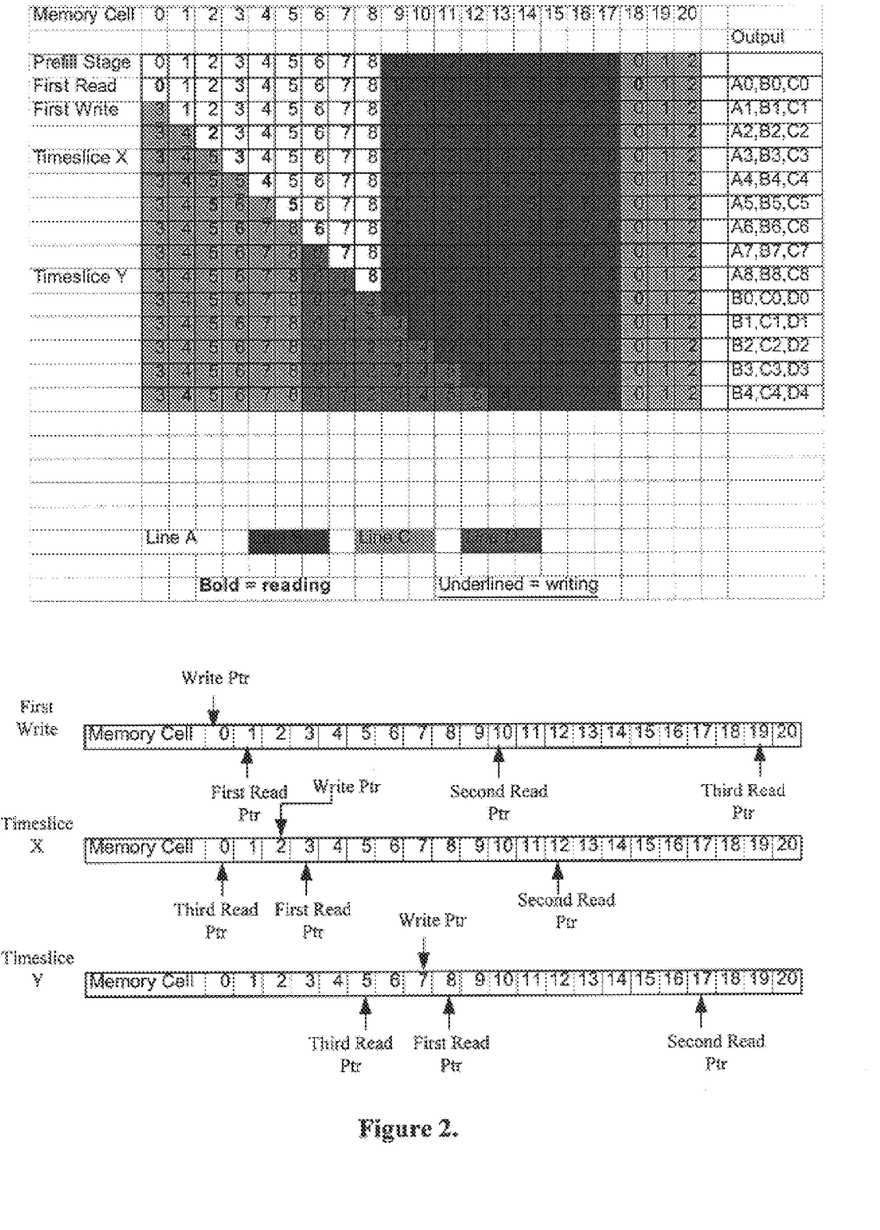
FIG. 2 illustrates a time-sliced view of a circular line buffer in accordance with the present invention.
Figure 3:
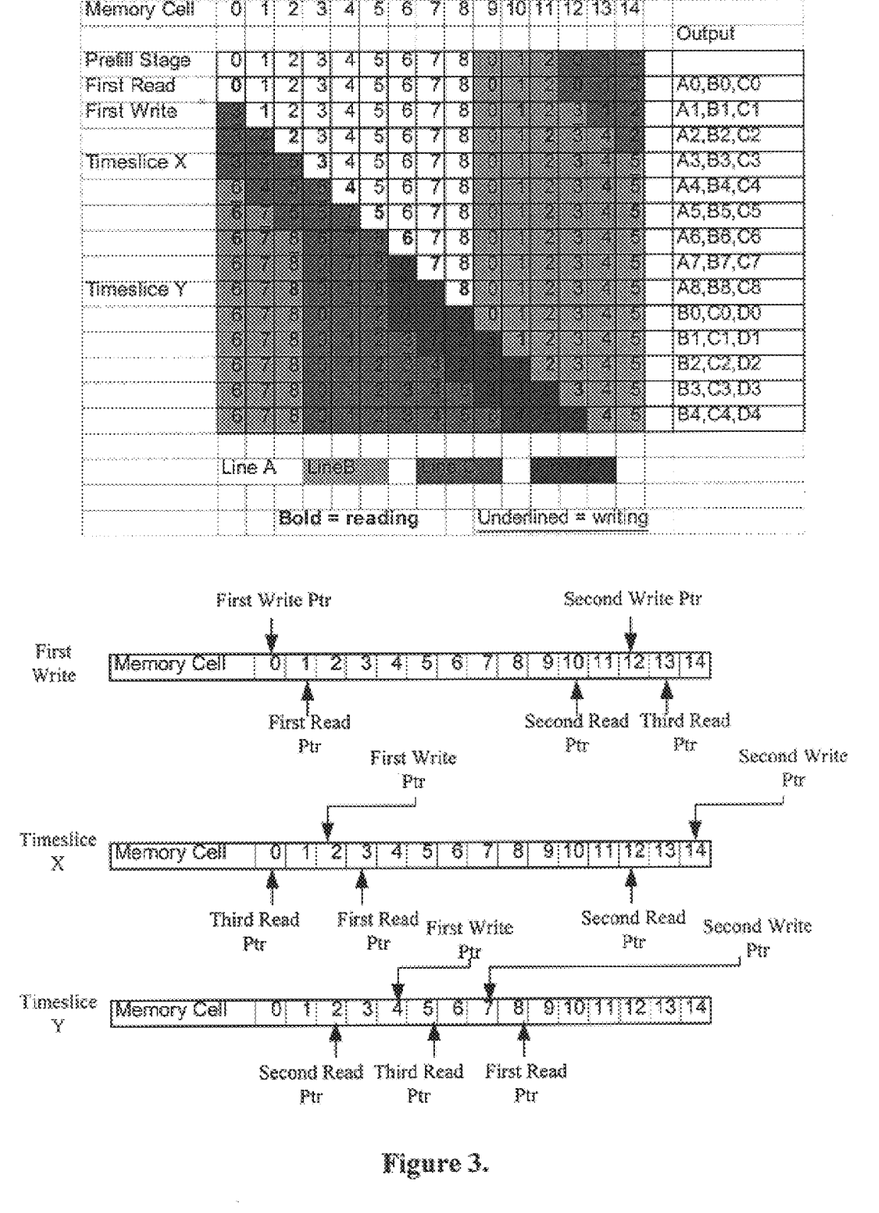
FIG. 3 illustrates another time-sliced view of a circular buffer in accordance with the present invention.

Storage and retrieval of data using the circular line buffer 10 can be better understood with reference to FIGS. 2 and 3. FIG. 2 illustrates a timesliced version of the circular line buffer 10 over a period of time. Each row of the table represents a separate slice of time, and illustrates the contents of the circular line buffer 10 at that particular time.

In the example illustrated in FIG. 2, the circular line buffer 10 includes 20 memory cells, where each memory cell stores pixel information for a particular pixel of a particular line. For illustration purposes, each line is assumed to include 8 pixels. It should be noted that the number of pixels per line is arbitrary, and the number 8 has been chosen merely to simplify the example illustrated. Referring to the table at the top of FIG. 2, the prefill timeslice has the memory cells in the circular line buffer storing two complete lines of data and a partial line. All the elements of lines A and B are in the circular line buffer, whereas only 3 line elements of line C are in the line buffer at the prefill stage. The prefill stage corresponds to the initialization of the circular line buffer.

Once the prefill operation has completed, data can be read from the circular line buffer for processing. Beginning at the timeslice labeled first read, the data elements that are read are shown in bold. Each read operation reads three data elements from the circular line buffer, preferably in a sequential manner based on three read pointers. At the first read, data elements A0, B0, and C0 are read.

In the following timeslice, labeled first write, data elements A1, B1, and C1 are read. As before, these data elements are preferably read sequentially and then converted from the serial data format to a parallel format by the shift register 100 before being presented to the combination block 30. At the timeslice corresponding to the first write operation, a new data element is stored in the memory cell 0. This write operation overwrites the A0 data element that was previously stored in memory cell 0. The A0 data element will not be used in any further calculations by the system illustrated, and therefore may be overwritten.

In order to understand how the read and write operations take place, a more detailed view of the first write timeslice is illustrated directly below the table portion of FIG. 2. The twenty memory cells are shown, where three read pointers point to three different locations within the circular line buffer. The first read pointer points to the memory cell 1, the second read pointer points to the memory cell 10, and the third read pointer points to the memory cell 19. These read pointers correspond to the three data read operations illustrated by the three bold number ones in the table above. Similarly, the write pointer is shown pointing to memory cell 0, thus indicating where new data is loaded into the circular line buffer.

With each read operation, the pointers are incremented such that they point to the next data element in the circular line buffer. Thus, moving forward in time to timeslice X, it can be seen that the first read pointer has stepped two memory locations to point to memory cell 3, the second read pointer now points to memory cell 12, and the third read pointer now points to memory cell 0. Note that the third read pointer now points to the data location that was written during the first write timeslice. The write pointer has also stepped forward and now points to memory cell 2. At timeslice X, data elements A3, B3, and C3 are read and combined.

As data elements from line A are used for the last time, they are replaced by new data elements from line C. Note that at the prefill timeslice, line C had only three data elements in the circular line buffer, but additional line elements from line C are added to the circular line buffer, replacing line elements of line A. Once all of the line elements from line C are included in the line buffer, the line elements from the next line following line C are gradually added to the circular line buffer. Thus, elements from line D are written into the circular line buffer once all of the elements from line C are present.

Timeslice Y illustrates a point in time where there are line elements from four different lines within the circular line buffer. At timeslice Y, all of the line elements from lines B and C are included in the line buffer, two line elements from line D are included, and one line element from line A remains. Referring to the more detailed view of timeslice Y at the bottom of FIG. 2, it can been seen that the first, second, and third read pointers point to locations 5, 8 and 17 within the circular line buffer. These memory cell locations correspond to the data element A8, B8, and C8. The write pointer points to memory cell 7, which is where the second line element of line D is written.

As data is finished being used for combining operations, it is replaced with additional data to be used in later combining operations. Operating as shown in FIG. 2, the data is maintained within the circular line buffer for reuse, but the amount of memory required to store the line buffer data is less than that needed to store three complete lines. The data element C0 which is present in the circular line buffer at the initial prefill stage remains in the circular line buffer until it is accessed by the first read pointer, the second read pointer, and the third read pointer. The data element C0 is used three times in the system which requires three data elements for processing, and once it has been used three times, it is replaced with new line element data.

By allowing the data to be loaded into the circular line buffer once from the external memory, and then reused multiple times, efficiency of data fetches from the memory is maximized. At the same time, the read and write pointers that address the circular line buffer are structured such that the write operations follow the read operations, which in turn allows the size of the circular line buffer to be reduced to a size smaller than M times the line width, where M is the number of data elements processed by the combination block.

FIG. 3 illustrates another embodiment of the invention, which utilizes a second write pointer to further reduce the amount of memory required to store the data for processing. However, the implementation illustrated in FIG. 3 requires data to be loaded into the system a second time in order for it to be used three times. Referring to the table at the top of FIG. 3, in the initial prefill state, the circular line buffer includes all of the elements of line A, and three elements from each of lines B and C. As data is read from the circular line buffer for processing, the two write pointers are utilized to bring new data into the circular line buffer. While line A is being overwritten by elements of line C, elements of line B overwrite elements of line C. This continues until all of the elements of line B are present in the memory, at which point elements of line D begin being loaded into the memory for processing.

By observing the data pattern illustrated in the figure and referring to the timeslices included at the bottom of FIG. 3 that illustrate the position of the read and write pointers with respect to the circular line buffer at different points in time, the influx and outflux of data elements from the circular line buffer can be understood. Each of the read pointers progresses through the circular line buffer in such a way that the appropriate data elements for processing are selected. The write pointers track these read pointers such that new data is brought into the circular line buffer to replace data which has been read and utilized. By determining optimal patterns for reading and writing data in the circular line buffer, the amount of memory required to store the circular line buffer is reduced.

Because the example systems illustrated in FIGS. 2 and 3 are relatively small in comparison to more practical systems that would have hundreds or thousands of pixels per line, it should be apparent that the amount of memory savings can be substantial. In order to further increase memory efficiency, the data may be fetched from the memory for storage in the circular line buffer at intervals determined based on the performance of a predetermined number of combination operations. After the data elements for the predetermined number of combinations has been fetched from the circular line buffer, a number of data elements may be read from the memory and written to the circular line buffer in a single block transfer. For example, twenty line elements from each of the lines stored in the circular line buffer may be fetched and combined before a write operation stores new data elements for future processing.

In a similar manner to the technique by which the read addressing block selects read pointers to be applied to the circular line buffer 10, a write pointer selector 70 may be employed to select one of the first and second write pointers 50 and 60 for use in storing new data to the circular line buffer 10. This type of setup would be applicable for manipulating data in the circular line buffer as was shown in FIG. 3. Note that the system may include more than two write pointers, and similarly may include many read pointers, depending on the complexity of the combination operation. Thus, if five lines are used in a scaling operation, five read pointers will be needed to retrieve data from the circular line buffer. The number of write pointers will be based on the amount of memory allocated for storage. Note also that it may be possible to write to more than one location in the line buffer 10 at one time. As such, multiple write pointers could be used in parallel to store new data in the line buffer, removing the need for the write pointer selector 70.

In yet other embodiments of the invention, the width of the circular line buffer may be adjusted such that each location of the circular line buffer stores a plurality of pixels for a line. In such embodiments, the data fetched from the circular line buffer can be routed to a corresponding plurality of shift registers. Once enough read operations have occurred that the shift registers contain the number of data elements for combination, the output of each of the shift registers can be provided to the combination block for processing. Providing these parallel shift registers may allow additional throughput to be achieved as the multiple combining operations can occur while the circular line buffer is accessed to retrieve the next sets of data to be combined.

Figure 4:
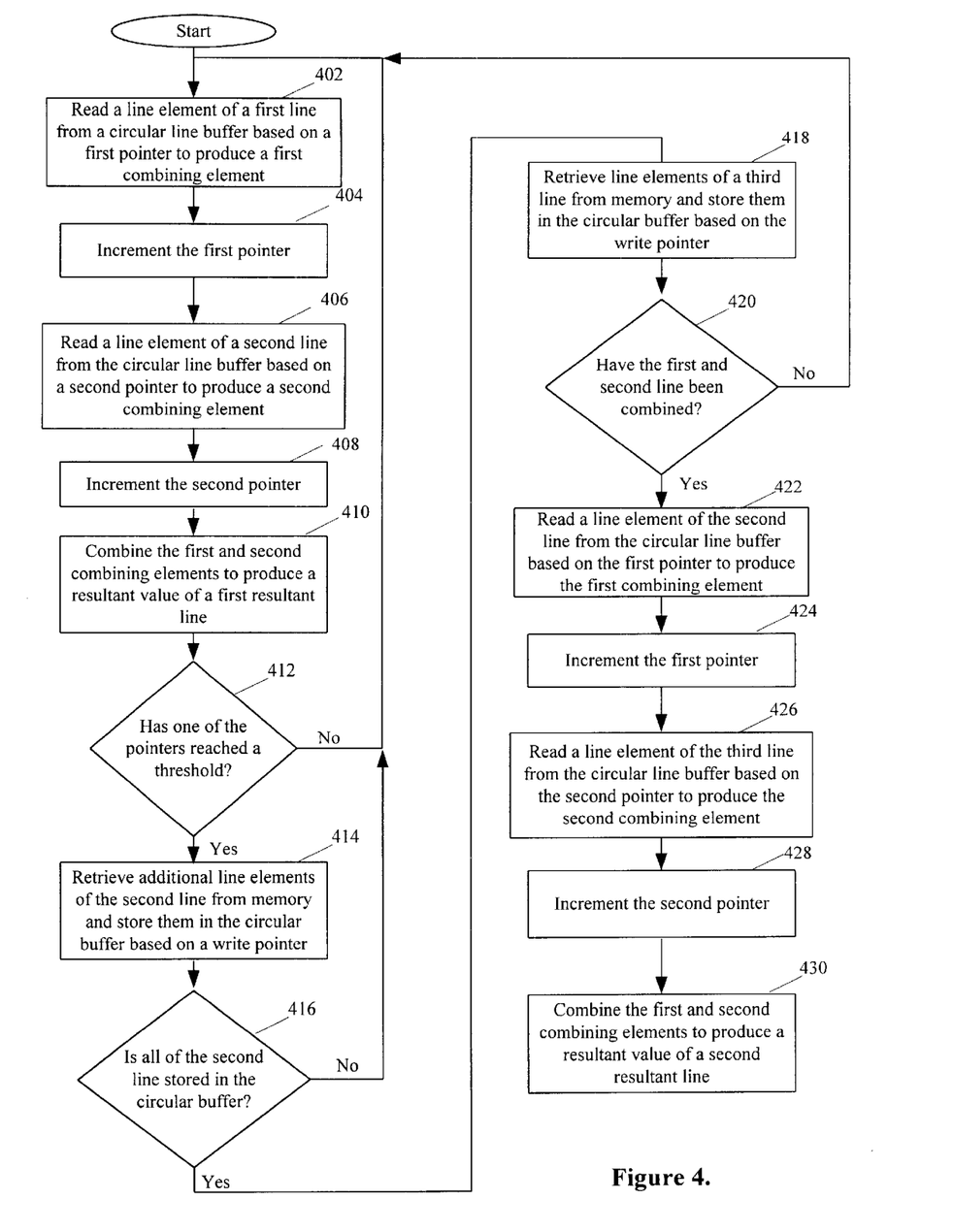
FIG. 4 illustrates a flow diagram of a method for calculating resultant values from a plurality of line elements in accordance with the present invention.

FIG. 4 illustrates a flow diagram of a method for calculating resultant values from a plurality of line elements. At step 402, a line element of a first line is read from a circular buffer based on a first pointer to produce a first combining element. At step 404, the first pointer is incremented. Incrementing the first pointer prepares the first pointer to read a subsequent line element for the next combination operation.

At step 406, a line element of a second line is read from the circular buffer based on a second pointer to produce a second combining element. At step 408, the second pointer is incremented. At step 410, the first combining element and the second combining element are combined to produce a resultant value of a first resultant line.

The method illustrated in FIG. 4 assumes a two line combining operation, and it should be apparent to one of ordinary skill in the art that additional read pointers can be added to the system to allow for data elements from additional lines to be included in the combining operation. Thus, if a third line is used in the combining operation, a third pointer will be utilized to address the circular buffer and retrieve a third combining element from a third line.

At step 412, it is determined whether one of the first or second pointers has reached a threshold level, which corresponds to a point where additional data is to be added to the circular line buffer. If the threshold level has not been reached, the method returns to step 402, and an additional set of read, increment, and combination operations is performed. If the threshold has been reached, at step 414 additional line elements of the second line are retrieved from memory and stored in the circular line buffer based on a write pointer. The additional line elements retrieved overwrite a portion of the first line.

At step 416, it is determined whether all of the second line has been loaded into the circular line buffer. If all of the second line is not yet loaded, steps 402–414 are repeated until all of the elements of the second line are in the circular line buffer. Once all of the second line is in the circular line buffer, the method proceeds to step 418, where elements of a third line are loaded into the circular line buffer based on the write pointer. Elements of the third line initially overwrite remaining elements of the first line in the memory.

At step 420 it is determined whether or not all of the combination operations that include elements of both the first and the second line are completed. In other words, it is determined whether all of the resultant elements in the first resultant line have been generated. If all of the combining operations required to generate the first resultant line are not yet complete, steps 402–418 are repeated until that is the case. When these operations are completed, the method proceeds to step 422, where a line element of the second line is read by the first pointer to produce the first combining element for the subsequent combining operation. The first pointer has cycled through all of the elements of the first line in the circular line buffer and now points to the first element of the second line. As before, at step 424, the first pointer is incremented in preparation for the next operation.

At step 426, a line element of the third line is read from the circular line buffer based on the second pointer to produce the second combining element. The second pointer has cycled through each of the line elements of the second line in the circular line buffer, and points to the beginning of the elements making up the third line. The second pointer is incremented at step 428. At step 430, the first and second combining elements are combined to produce a resultant element of a second line.

Using the read pointers to address the circular line buffer and allowing the data in the circular line buffer to be overwritten once it has been used in all of the combining operations in which it is involved allows for a smaller-sized line buffer than would be required if the data was loaded into the buffer on a line-by-line basis. The reduction in memory size can be especially significant in graphics applications that involve large lines with many data elements.

Figure 5:
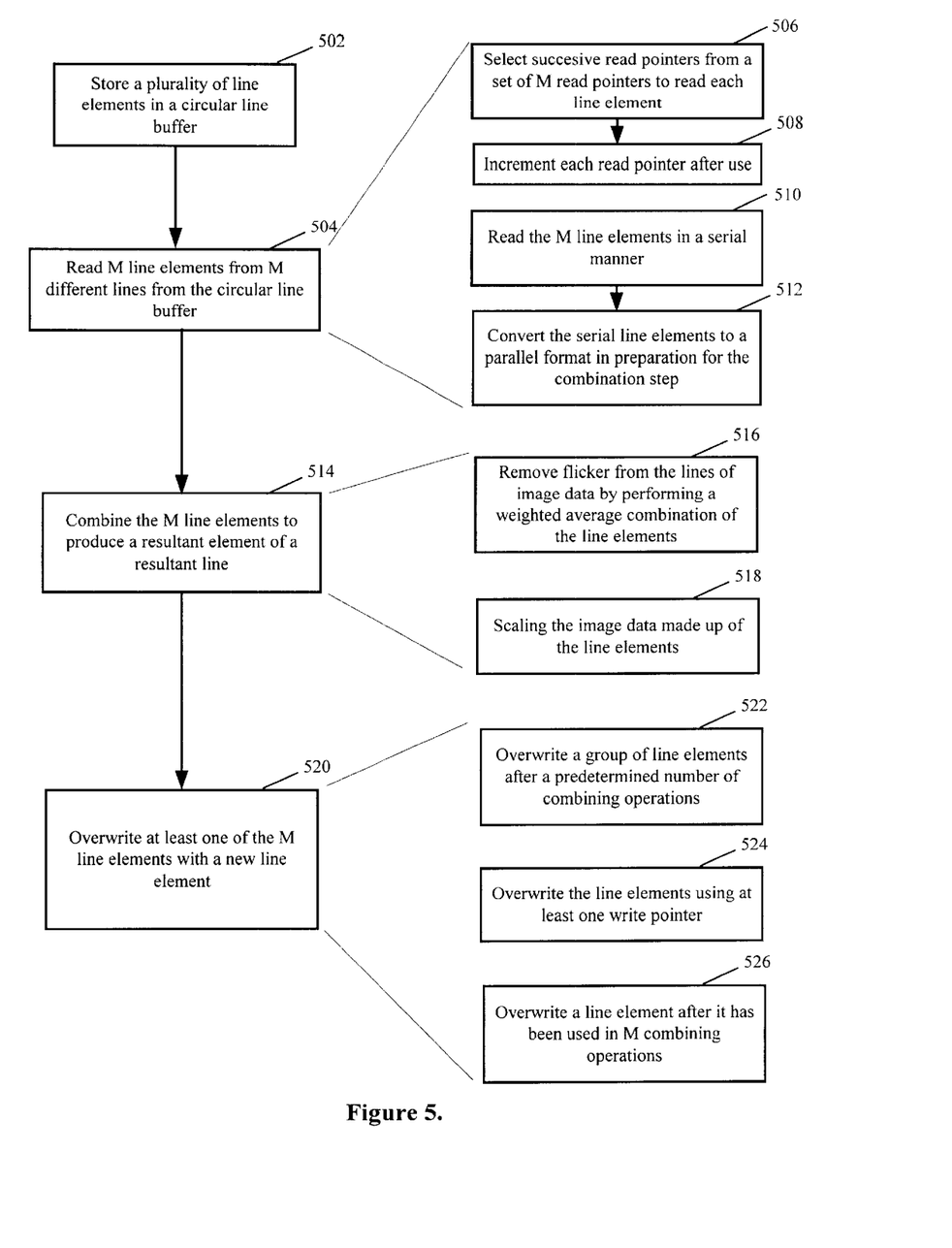
FIG. 5 illustrates a flow diagram of a method for processing line elements in accordance with the present invention.

FIG. 5 illustrates a method for processing line elements that requires a reduced amount of memory. At step 502, a plurality of line elements are stored in a circular line buffer, where portions of the plurality of line elements correspond to lines of image data. Each of the lines of image data includes N line elements.

At step 504, M line elements are read from the circular line buffer, where the M line elements are from M different lines. M is understood to be a number. Reading a line element from the memory may further comprise steps 506–512. At step 506, a read pointer is selected from a number of read pointers, where the number of read pointers is equal to the number of line elements to be combined (M). At step 508, the selected read pointer is incremented in preparation to select the subsequent line element for the next combination operation. At step 510, in the case where the circular line buffer can only be addressed with a single address at one time, the read operations to the circular line buffer occur in a serial manner. The result of the serial read operations is a serial stream of line elements. At step 512, the serial data stream is converted to a parallel data stream for processing. Preferably, this is accomplished using one or more serial-to-parallel shift registers.

At step 514, the M data elements read from the line buffer are combined to produce a resultant element of a resultant line. Preferably, the combination operation at step 514 includes step 516, where a flicker removal operation is performed. As described earlier, flicker removal may include performing a weighted average of the M line elements. Step 514 may also include step 518, where a scaling operation is performed. The scaling operation of step 518 utilizes the M line elements to produce a resultant scaled line element. An example of a scaling operation might be reducing three lines of data to a single line of data, where the scaling operation will average the line elements from each of the three contributing lines to determine a resultant line element.

At step 520, at least one of the M line elements that has been read and used in combining operations is overwritten with new line element data. As before, at step 522, the overwriting may be performed such that a number of combination operations occur before a block overwrite is performed. Preferably, at step 524, the overwriting is performed based on a write pointer. The write pointer is updated in a similar manner to the read pointers such that it continuously tracks the read pointers through the circular line buffer replacing data which has been read and utilized in previous combination operations. More preferably, at step 526, a data element is overwritten which has been used M times. Thus, once the data has been written to the circular line buffer, it is preferably read out M times and used in M operations, where each operation uses M line elements. Once the data has been used in M operations, it is no longer needed and is therefore overwritten. This maximizes the reuse of data in the circular line buffer and also maximizes the efficiency of the memory fetches which are used to acquire data for the circular line buffer.

It should be understood that the implementation of other variations and modifications of the invention and its various aspects will be apparent to those of ordinary skill in the art, and that the invention is not limited to the specific embodiments described. It is therefore contemplated to cover by the present invention, any and all modifications, variations, or equivalents that fall within the spirit and scope of the basic underlying principles disclosed and claimed herein.

What is claimed is:

1. A method for calculating resultant values from a plurality of line elements, comprising:

(a) reading a line element of a first line from a circular buffer based on a first pointer to produce a first combining element;

(b) incrementing the first pointer;

(c) reading a line element of a second line from the circular buffer based on a second pointer to produce a second combining element;

(d) incrementing the second pointer;

(e) combining the first combining element and the second combining element to produce a resultant value of a first resultant line;

(f) repeating steps (a)–(e) until one of the first and second pointers has reached a threshold value;

(g) retrieving additional line elements of the second line from memory, wherein the additional line elements of the second line are stored in the circular buffer based on a write pointer wherein the additional line elements overwrite a portion of the first line;

(h) repeating steps (a)–(g) until the threshold value has been reached and the line is stored in the circular buffer;

(i) retrieving line elements of a third line from the memory, wherein the line elements of the third line are stored in the circular buffer based on the write pointer, wherein the additional line elements overwrite at least a portion of remaining line elements of the first line;

(j) repeating steps (a)–(i) until all line elements of the first line and the second line have been combined;

(k) reading a line element of the second line from the circular buffer based on the first pointer to produce the first combining element;

(l) incrementing the first pointer;

(m) reading a line element of the third line from the circular buffer based on the second pointer to produce the second combining element;

(n) incrementing the second pointer; and (o) combining the first combining element and the second combining element to produce a resultant value of a second resultant line.

2. A line combination unit, comprising:

a memory, wherein the memory stores a plurality of lines of data;

a combination block, wherein the combination block is operably coupled to receive M line elements, where M is a number, wherein the combination block combines the M line elements to produce a result element;

a circular line buffer operably coupled to the memory and the combination block, wherein the circular line buffer stores a plurality of line elements from a portion of the plurality of lines of data;

a read addressing block operably coupled to the circular line buffer, wherein the read addressing block generates M read pointers corresponding to the circular line buffer;

a first write pointer, wherein the first write pointer points to a first write location in the circular line buffer, wherein the first write location corresponds to a previously read location in the circular line buffer; and a controller operably coupled to the memory, the combination block, the circular line buffer, the read addressing block and the first write pointer, wherein the controller provides control information to the memory, the combination block, the circular line buffer, the read addressing block and the first write pointer such that line element data is read from the circular line buffer based on the M read pointers and combined in the combination block, wherein the controller replaces line elements in the line buffer with line element data based on the first write pointer.

3. The line combination unit of claim 2, wherein the read addressing block includes:

M read pointers registers, wherein each of the M read pointer registers stores a read pointer that points to a line element of a different line in the circular line buffer;

a read pointer selector operably coupled to the M read pointers, wherein the read pointer selector selects a selected read pointer from the M read pointers, wherein the selected read pointer is used to address the circular line buffer.

4. The line combination unit of claim 3 further comprises a shift register operably coupled to the circular line buffer and the combination block, wherein the shift register serially receives M line elements of data from the circular line buffer and provides the M line elements of data to the combination block in a parallel format.

5. The line combination unit of claim 4, wherein the plurality of lines of data in the memory include lines of image data.

6. The line combination unit of claim 5, wherein the combination block removes flicker from the image data.

7. The line combination unit of claim 6, wherein the combination block performs a weighted average of the M line elements to produce a flicker removed element.

8. The line combination unit of claim 4, wherein the combination block performs a scaling operation on the image data.

9. The line combination unit of claim 2, wherein the controller performs block fetches of data from the memory, wherein at least a portion of the data fetched during the block fetches is stored in the circular buffer based on the first write pointer.

10. The line combination unit of claim 2 further comprises a second write pointer operably coupled to the controller and the circular line buffer, wherein the second write pointer points to a second write location in the circular buffer, wherein the controller replaces line elements in the line buffer with line element data based on the first and second write pointers.

11. A method for processing line elements, comprising:

storing a plurality of line elements in a circular line buffer, wherein portions of the plurality of line elements correspond to lines of image data, wherein each line includes N line elements;

reading M line elements of the plurality of line elements, wherein the M line elements are from M different lines, wherein M is a number;

combining the M line elements to produce a resultant element of a resultant line; and overwriting at least one of the M line elements with new line element data.

12. The method of claim 11, wherein reading M line elements further comprises:
   selecting successive read pointers from a set of M read pointers, wherein each of the M read pointers is used to address the circular line buffer to read one of the M line elements; and
   incrementing the M read pointers in preparation for a subsequent read operation.

13. The method of claim 12, wherein the step of reading further comprises:
   reading the M line elements in a serial manner such that only one of the read pointers is used to address the circular line buffer at a particular time; and
   shifting the M line elements into a serial-to-parallel shift register to structure the M line elements in a parallel format.

14. The method of claim 13, wherein the step of overwriting further comprises overwriting a line element in the circular line buffer corresponding to a line element that has been read and combined M times since being stored in the circular line buffer.

15. The method of claim 13, wherein the step of overwriting further comprises overwiting based on at least one write pointer.

16. The method of claim 13, wherein the step of overwriting further comprises overwriting a group of line elements after a predetermined number of combining operations.

17. The method of claim 13, wherein the step of combining further comprises removing flicker from the lines of image data by combining each set of M line elements based on a flicker removal algorithm.

18. The method of claim 17, wherein the step of removing flicker further comprises performing a weighted average of the M line elements.

19. The method of claim 13, wherein the step of combining further comprises scaling the image data by combining the M line elements based on a scaling algorithm.

* * * * *